United States Patent
Beehler et al.

(10) Patent No.: US 6,572,294 B2
(45) Date of Patent: *Jun. 3, 2003

(54) VACUUM PLATEN AND METHOD FOR USE IN PRINTING DEVICES

(75) Inventors: James O Beehler, Brush Prairie, WA (US); Steve O Rasmussen, Vancouver, WA (US); Robert M Yraceburu, Camas, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 9 days.

This patent is subject to a terminal disclaimer.

(21) Appl. No.: 09/970,468

(22) Filed: Oct. 3, 2001

(65) Prior Publication Data

US 2002/0015610 A1 Feb. 7, 2002

Related U.S. Application Data

(63) Continuation of application No. 09/515,086, filed on Feb. 28, 2000, now Pat. No. 6,328,491.

(51) Int. Cl.[7] .......................... B41J 29/377; B41J 13/08
(52) U.S. Cl. ......................... 400/648; 400/635; 347/34
(58) Field of Search ................................ 400/648, 649, 400/635; 101/407.1, 474; 347/25, 90, 35, 36, 101, 104, 34; 355/73

(56) References Cited

U.S. PATENT DOCUMENTS

| 4,023,481 A | 5/1977 | Keeny ..................... 100/319 |
|---|---|---|
| 4,092,915 A | 6/1978 | Keeny ..................... 100/319 |
| 4,636,809 A | 1/1987 | Eremity ..................... 347/90 |
| 4,786,946 A | 11/1988 | Jessop ..................... 355/28 |
| 5,537,134 A | 7/1996 | Baldwin et al. ............... 347/85 |
| 5,700,495 A | 12/1997 | Kemerer et al. ............. 425/190 |
| 5,717,446 A | 2/1998 | Teumer et al. ................ 347/35 |
| 5,841,454 A | 11/1998 | Hall et al. ..................... 347/87 |
| 5,917,523 A | 6/1999 | Baldwin et al. ............... 347/85 |
| 5,936,650 A | 8/1999 | Ouchida et al. ............... 347/89 |
| 6,017,111 A * | 1/2000 | Kurata ......................... 347/34 |
| 6,328,442 B1 * | 12/2001 | Brinkly ..................... 347/104 |
| 6,328,491 B1 * | 12/2001 | Beehler et al. ............. 400/648 |
| 6,464,328 B1 * | 10/2002 | Hiramatsu et al. ........... 347/34 |
| 2003/0007026 A1 * | 1/2003 | Matsumoto et al. .......... 347/19 |

FOREIGN PATENT DOCUMENTS

| JP | 62-251147 | 10/1987 | |
|---|---|---|---|
| JP | 01209147 A * | 8/1989 | .............. B41J/3/04 |
| JP | 03208652 A * | 9/1991 | .............. B41J/2/01 |
| JP | 5-107969 | 4/1993 | |

* cited by examiner

*Primary Examiner*—Daniel J. Colilla
(74) *Attorney, Agent, or Firm*—Erik A. Anderson

(57) ABSTRACT

A vacuum platen and method for use thereof in a printing device are disclosed. An apparatus embodiment includes a first surface having a plurality of first apertures therethrough, a labyrinth configured to include a plurality of passageways each of which is fluidly coupled to at least one of the first apertures, and a second surface having a plurality of second apertures therethrough each of which is fluidly coupled to the vacuum source and at least one of the passageways thereby establishing an airflow from the first apertures, through the passageways, and out the second apertures. The vacuum platen also includes at least one receptacle in each of the passageways, each receptacle configured to collect debris from the airflow as it travels through the labyrinth. A method embodiment includes distributing a vacuum hold-down force over the printzone, conducting an airflow causing the vacuum hold-down force from the printzone to the vacuum source, and collecting debris from the airflow by changing a direction of travel of the airflow as it is conducted from the printzone to the vacuum source. Further characteristics and features of the apparatus and method are disclosed herein.

14 Claims, 3 Drawing Sheets

VACUUM PLATEN AND METHOD FOR USE IN PRINTING DEVICES

CROSS REFERENCE TO RELATED APPLICATION(S)

This is a continuation of application Ser. No. 09/515,086 filed on Feb. 28, 2000, now U.S. Pat. No. 6,328,491, which is hereby incorporated by reference herein.

BACKGROUND AND SUMMARY

The present invention relates to printing devices. More particularly, the present invention relates to a vacuum platen and method for use in printing devices.

Printing devices, such as inkjet printers and laser printers, use printing composition (e.g., ink or toner) to print text, graphics, images, etc. onto a print medium in a printzone of the printing device. Inkjet printers may use print cartridges, also known as "pens", which shoot drops of printing composition, referred to generally herein as "ink", onto a print medium such as paper, transparencies or cloth. Each pen has a printhead that includes a plurality of nozzles. Each nozzle has an orifice through which the drops are fired. To print an image, the printhead is propelled back and forth across the print medium in the printzone by, for example, a carriage while shooting drops of ink in a desired pattern as the printhead moves. The particular ink ejection mechanism within the printhead may take on a variety of different forms known to those skilled in the art, such as thermal printhead technology.

In a current thermal system, a barrier layer containing ink channels and vaporization chambers is located between an orifice plate and a substrate layer. This substrate layer typically contains linear arrays of heating elements, such as resistors, which are energized to heat ink within the vaporization chambers. Upon heating, the ink in the vaporization chamber turns into a gaseous state and forces or ejects an ink drop from an orifice associated with the energized resistor. By selectively energizing the resistors as the printhead moves across the print medium, the ink is expelled in a pattern onto the print medium to form a desired image (e.g. picture, chart and/or text).

Print media are transported through the printzone one or more times by a print media handling system of the printing device. Print media handling systems may take on a variety of different forms including those that utilize a belt or web transport that is disposed around a pair of driven rollers. Such belt or web transports may utilize a vacuum force to secure the print medium during transport through the printzone. Such vacuum force may be established through the use of a vacuum platen with which the belt or web transport is in fluid communication. Vacuum platens typically include a plurality of apertures through which an airflow is established by a vacuum source. This airflow is fluidly coupled to the belt or web transport by a plurality of apertures in the belt or web transport.

The environment in the area of the printzone is often full of printing composition aerosol and spray, as well as print medium dust and other types of debris. Over time, the apertures of a vacuum platen may fill and partially or completely clog with such debris. Such clogging reduces the airflow, thereby decreasing the securing force holding the print medium against the belt or web transport. If the print media is improperly secured to the belt or web transport while passing through the printzone, then both output print quality of the printing device and printing device throughput will likely decrease. In addition, print media with improperly printed output will be wasted.

In some cases, the apertures of a vacuum platen may fill with enough debris so that the airflow is substantially reduced or eliminated, resulting in insufficient or no securing force for holding the print medium to the belt or web transport. In such cases, the printing device effectively becomes inoperable.

Noise is another problem associated with the use of vacuum platens in printing devices. Such noise is caused by the airflow used to secure the print media to the belt or web transport as the airflow travels through the vacuum platen. The amount of this noise varies depending on the particular configuration of the vacuum platen, but it can reach objectionable levels to some users of printing devices. In such cases, depending on the extent of user noise intolerance, printing device use will decrease or, even worse, cease altogether.

Alleviation of these above-described problems would be a welcome improvement, thereby helping minimize delay in the completion of printing tasks, helping maximize printing device throughput, helping prevent instances of waste of print media, and helping quiet annoying noise created during use of the printing device. Accordingly, the present invention is directed to solving these problems.

An embodiment of a vacuum platen in accordance with the present invention for use in a printing device, having a vacuum source, includes a first surface having a plurality of first apertures therethrough and a labyrinth configured to include a plurality of passageways each of which is fluidly coupled to at least one of the first apertures. The vacuum platen also includes a second surface having a plurality of second apertures therethrough each of which is fluidly coupled to the vacuum source and at least one of the passageways thereby establishing an airflow from the first apertures, through the passageways, and out the second apertures. The vacuum platen additionally includes at least one receptacle in each of the passageways, each receptacle configured to collect debris from the airflow as it travels through the labyrinth.

The above-described embodiment of a vacuum platen in accordance with the present invention may be modified and include the following characteristics, as described below. The vacuum platen may further include an orifice restrictor plate fluidly coupled to the airflow. The orifice restrictor plate is configured to impede the airflow thereby helping limit the airflow required from the vacuum source which reduces vacuum source size and power requirements. The orifice restrictor plate is also configured to reduce an acoustic energy level of the airflow thereby helping to quiet the vacuum platen during use thereof in the printing device.

The vacuum platen may include a filter configured to collect debris from the airflow. In such cases, the filter may be configured to reduce an acoustic energy level of the airflow thereby helping to quiet the vacuum platen during use thereof in the printing device.

The passageways may be configured to decrease in size from the first surface toward the second surface.

An alternative embodiment of a vacuum platen in accordance with the present invention for use in a printing device having a vacuum source includes a first surface having a plurality of first apertures therethrough and a second surface having a plurality of second apertures therethrough each of which is fluidly coupled to the vacuum source. The vacuum platen also includes a plurality of passageways each of which is fluidly coupled to at least one of the first apertures and at least one of the second apertures thereby establishing an airflow from the first apertures, through the passageways, and out the second apertures. The passageways are configured to include a receptacle for collecting debris from the airflow as it travels through the passageways.

The above-described alternative embodiment of a vacuum platen in accordance with the present invention may be modified and include the following characteristics, as described below. The vacuum platen may further include an orifice restrictor plate fluidly coupled to the airflow. In such cases, the orifice restrictor plate is configured to impede the airflow thereby helping limit the airflow required from the vacuum source which reduces vacuum source size and power requirements. The orifice restrictor plate is also configured to reduce an acoustic energy level of the airflow thereby helping to quiet the vacuum platen during use thereof in the printing device.

The vacuum platen may further include a filter configured to collect debris from the airflow. In such cases, the filter may be configured to reduce an acoustic energy level of the airflow thereby helping to quiet the vacuum platen during use thereof in the printing device.

The passageways may be configured to be successively smaller in a direction of the airflow.

Another alternative embodiment of a vacuum platen in accordance with the present invention for use in a printing device having a vacuum source which produces an airflow and a printzone where printing composition is deposited on a print medium includes structure for distributing a vacuum hold-down force over the printzone. The vacuum platen also includes structure for conducting the airflow from the vacuum source to the structure for distributing. The vacuum platen further includes structure for collecting debris from the airflow in the structure for conducting by changing a direction of travel of the airflow as it travels through the structure for conducting.

The above-described alternative embodiment of a vacuum platen in accordance with the present invention may be modified and include the following characteristics, as described below. The vacuum platen may further include structure fluidly coupled to the structure for conducting and the vacuum source for restricting the airflow as it exits the structure for conducting thereby helping limit the airflow required from the vacuum source which reduces vacuum source size and power requirements. The structure for restricting is configured to reduce an acoustic energy level of the airflow thereby helping to quiet the vacuum platen during use thereof in the printing device.

The vacuum platen may further include structure for filtering debris from the airflow. In such cases, the structure for filtering is configured to reduce an acoustic energy level of the airflow thereby helping to quiet the vacuum platen during use thereof in the printing device.

An embodiment of a method in accordance with the present invention for use in a vacuum platen of a printing device, the printing device having a vacuum source and a printzone where printing composition is deposited on a print medium includes distributing a vacuum hold-down force over the printzone. The method also includes conducting an airflow causing the vacuum hold-down force from the printzone to the vacuum source and collecting debris from the airflow by changing a direction of travel of the airflow as it is conducted from the printzone to the vacuum source.

The above-described embodiment of a method in accordance with the present invention may be modified and include the following characteristics, as described below. The method may further include restricting the airflow before it reaches the vacuum source to impede the airflow thereby helping limit the airflow required from the vacuum source and also to reduce an acoustic energy level of the airflow thereby helping to quiet the vacuum platen during use thereof in the printing device. The method may include filtering debris from the airflow.

The foregoing summary is not intended by the inventors to be an inclusive list of all the aspects, advantages, and features of the present invention, nor should any limitation on the scope of the invention be implied therefrom. This summary is provided in accordance with 37 C.F.R. Section 1.73 and M.P.E.P. Section 608.01(d). Other objects, advantages, and novel features of the present invention will become apparent from the following detailed description of the invention when considered in conjunction with the accompanying drawings.

DETAILED DESCRIPTION OF THE DRAWINGS

Figure 1:
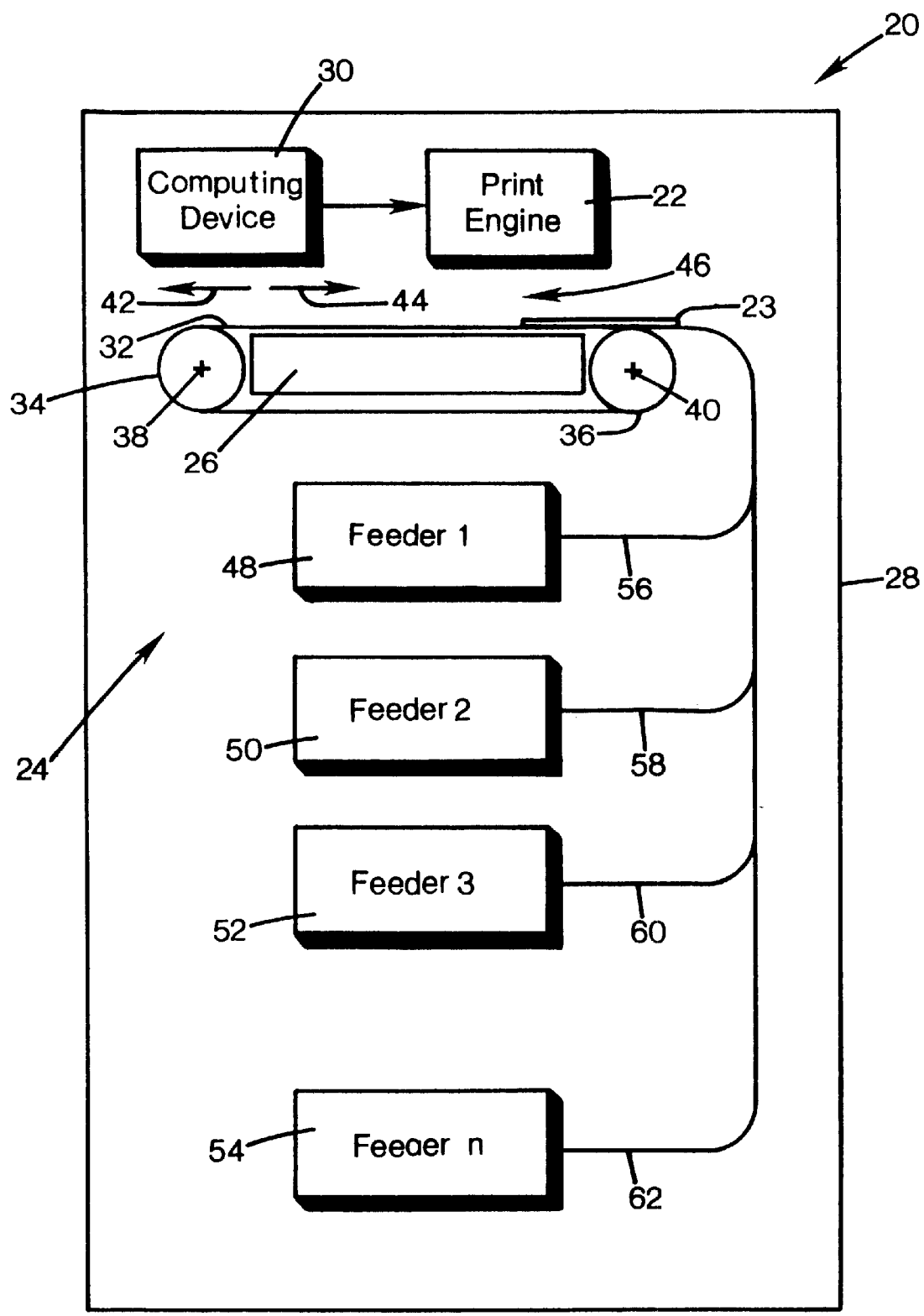
FIG. 1 is a diagrammatic view of a printing device that includes an embodiment of the present invention.

FIG. 1 illustrates a diagrammatic view of an inkjet printing device 20 that includes an embodiment of the present invention and which may be used for printing business reports, correspondence, desktop publishing, and the like. A variety of printing devices are commercially available. For instance, some of the printing devices that may embody the present invention include printers, plotters, copiers, and facsimile machines, to name a few, as well as various combination devices, such as combination facsimiles and printers. In addition, the present invention may be used in a variety of types of printing devices such as inkjet printers, dot matrix printers, and laser printers.

Some of the major elements of printing device 20 are shown in FIG. 1, including print engine 22, print media handling system 24, vacuum platen 26 in accordance with the present invention, and housing or casing 28.

Print engine 22 may comprise any type of apparatus by which an image is recorded on print medium 23, including inkjet printing mechanisms and laser mechanisms. A computing device 30 is used to control formation of images on print medium 23 by print engine 22. Computing device 30 typically receives instructions from a host device, typically a computer, such as a personal computer (not shown). Many of the functions of computing device 30 may be performed by a host computer, including any printing device 20 drivers resident on the host computer, by electronics in printing device 20, or by interactions between the host computer and the electronics. As used herein, the term "computing device 30" encompass these functions, whether performed by a host computer, printing device 20, an intermediary device between the host computer and printing device 20, or by combined interaction of such elements.

Print media handling system 24 includes a belt or web transport 32 that is disposed around a pair of driven rollers 34 and 36. Rollers 34 and 36 may be selectively driven by computing device 30 of printing device 20 and one or more motors and drive gears (both of which are not shown) so as to rotate about points 38 and 40 in either a clockwise or counter-clockwise direction which allows web or belt transport 32 to selectively move in either of the directions indicated by arrows 42 and 44. Belt transport 32 is in fluid communication with vacuum platen 26 by, for example, a plurality of apertures (not shown) formed though web or belt transport 32. In this manner, print medium 23 is held against web or belt transport 32 for the span of the length of vacuum platen 26 and can be moved to and from printzone 46 any number of times. This span may be changed by resizing the dimensions of vacuum platen 26. The construction and operation of vacuum platen 26 will be discussed more fully below in connection with FIGS. 2 and 3.

As can also be seen in FIG. 1, print media handing system 24 also includes a plurality of print media feeders 48, 50, 52, and 54. Feeders 48, 50, 52, and 54 each include a tray for sheets of print media or a rack for a roll of print media, as well as the necessary components to transport print media to printzone 46 of printing device 20 for printing by print engine 22 via feed paths 56, 58, 60, and 62. Feeders 48, 50, 52, and 54 may each be separately configured to hold various sized print media or fixed sized print media. Computing device 30 of printing device 20 is also coupled to each of feeders 48, 50, 52, and 54 to control selective transport of print media from any one of feeders 48, 50, 52, and 54 to printzone 46 for printing of images by print engine 22. The present invention may be used with printing devices having any number of print media input trays and/or racks which is noted in FIG. 1 through the use of the designation "Feeder n" for feeder 54.

Vacuum platens, such as vacuum platen 26, typically include a plurality of apertures through which an airflow is established by a vacuum source. This airflow is fluidly coupled to belt or web transport 32 by a plurality of apertures (not shown) in the belt or web transport 32. The environment in the area of printzone 46 is often full of printing composition aerosol and spray, as well as print medium dust and other types of debris. Over time, the apertures of a vacuum platen may fill and partially or completely clog with such debris. Such clogging reduces the airflow, thereby decreasing the securing force holding print medium 23 against belt or web transport 32. If print medium 23 is improperly secured to belt or web transport 32 while passing through printzone 46, then both output print quality of printing device 20 and printing device throughput will likely decrease. In addition, print media with improperly printed output will be wasted.

In some cases, the apertures of a vacuum platen may fill with enough debris so that the airflow is substantially reduced or eliminated, resulting in insufficient or no securing force for holding the print medium to the belt or web transport. In such cases, the printing device effectively becomes inoperable.

Noise is another problem associated with the use of vacuum platens in printing devices. Such noise is caused by the airflow used to secure the print media to the belt or web transport as the airflow travels through the vacuum platen. The amount of this noise varies depending on the particular configuration of the vacuum platen, but it can reach objectionable levels to some users of printing devices. In such cases, depending on the extent of user noise intolerance, printing device use will likely decrease or, even worse, cease altogether.

Alleviation of the above-described problems would be a welcome improvement, thereby helping minimize delay in the completion of printing tasks, helping maximize printing device throughput, helping prevent instances of waste of print media, and helping quiet annoying noise created during use of the printing device. Accordingly, the present invention is directed to solving these problems.

Figure 2:
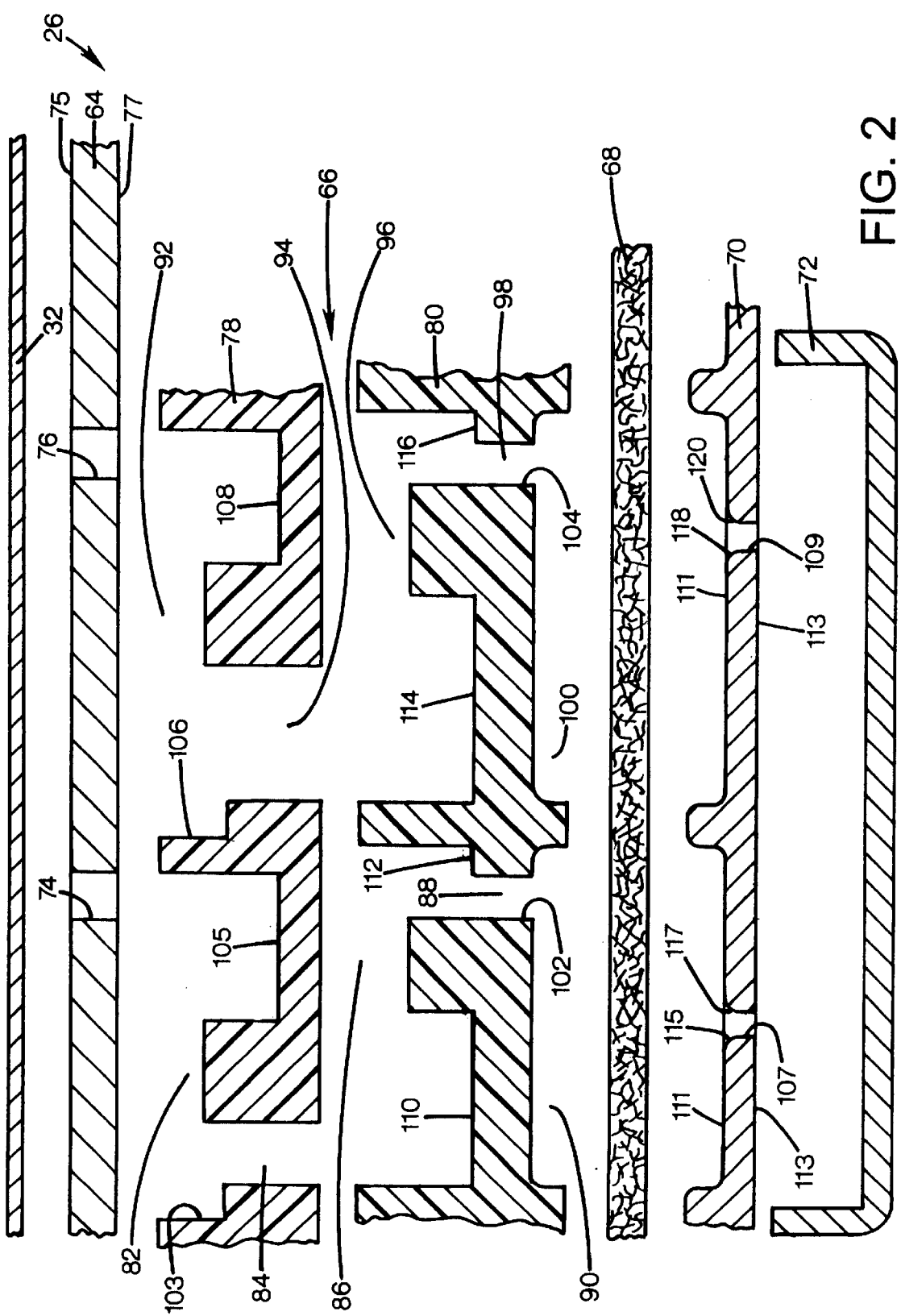
FIG. 2 is an exploded sectional view of an embodiment of a vacuum platen in accordance with the present invention.

An exploded sectional view of an embodiment of vacuum platen 26 in accordance with the present invention is shown in FIG. 2. Web or belt transport 32 is also shown in FIG. 2. As discussed above, web or belt transport 32 is in fluid communication with vacuum platen 26 by, for example, a plurality of apertures (not shown) formed though web or belt transport 32. Web or belt transport 32 may be constructed from a variety of materials, including metal as shown in FIG. 2.

As can be seen in FIG. 2, vacuum platen 26 includes a top plate 64, a labyrinth 66, a filter 68, an orifice restrictor plate 70, and a vacuum source 72. Top plate 64, orifice restrictor plate 70, and the housing of vacuum source 72 may be made from a variety of materials including metal, as shown. Labyrinth 66 may be made from a variety of materials including plastic, as shown. Filter 68 may also be made from a variety of porous or fibrous materials such as cellulose, mesh, fabric, cotton, polypropylene, polyester, fiberglass, or wire mesh.

As can be seen in FIG. 2, top plate 64 is configured to include a plurality of apertures 74 and 76 through surfaces 75 and 77 of top plate 64 so as to allow fluid communication between top plate 64 and the apertures (not shown) in web or belt transport 32. As can also be seen in FIG. 2, surface 75 of top plate 64 is positioned adjacent web or belt transport 32 and surface 77 of top plate 64 is positioned adjacent labyrinth 66.

Labyrinth 66 is shown in FIG. 2 as including respective first and second stages 78 and 80. Although two stages 78 and 80 are shown, it is to be understood that in other embodiments of the present invention one stage or more than two stages may be used. As can be seen in FIG. 2 and as more fully discussed below in connection with FIG. 3, stage 78 of labyrinth 66 is configured to include a plurality of passageways 82, 84, 92 and 94, and stage 80 of labyrinth 66 is configured to include a plurality of passageways 86, 88, 90, 96, 98 and 100. Stage 80 of labyrinth 66 is also configured to include apertures 102 and 104. Each of passageways 82, 84, 86, 88, 90, 92, 94, 96, 98 and 100 is fluidly coupled to at least one of apertures 74 and 76 in top plate 64, and also at least one of apertures 102 and 104 so that air may flow from apertures 74 and 76, through passageways 82, 84, 86, 88, 92, 94, 96, and 98, and out apertures 102 and 104, as more fully discussed below in connection with FIG. 3.

As can also be seen in FIG. 2, first stage 78 of labyrinth 66 is configured to include receptacles 103, 105, 106, and 108 and second stage 80 of labyrinth 66 is configure to include receptacles 110, 112, 114, and 116. Receptacles 103, 105, 106, 108, 110, 112, 114, and 116 are each configured to collect debris from an airflow traveling through vacuum platen 26, as more fully discussed below in connection with FIG. 3.

Filter 68 of vacuum platen 26 is positioned between labyrinth 66 and orifice restrictor plate 70 as shown. Filter 68 is configured to collect at least some of any debris from the airflow traveling though vacuum platen 26 that may not have been collected by receptacles 103, 105, 106, 108, 110, 112, 114, and 116.

Orifice flow restrictor plate 70 of vacuum platen 26 is positioned between filter 68 and vacuum source 72. As can be seen in FIG. 2, orifice flow restrictor plate 70 is configured to include a plurality of apertures 107 and 109 that extend through surfaces 111 and 113 of orifice flow restrictor plate 70. Apertures 107 and 109 are fluidly coupled to the airflow through filter 68. Orifice flow restrictor plate 70 is configured to impede this airflow, thereby reducing its acoustic energy level to help quiet vacuum platen 26 during use of printing device 20.

As can also be seen in FIG. 2, edge portions 115 and 117 of aperture 107 and edge portions 118 and 120 of aperture 109 are curved. This curved shape provides both a more uniform airflow through orifice restrictor plate 70, thereby further helping to quiet vacuum platen 26 during use of printing device 20, and a more predictable airflow when fabricating multiple orifice flow restrictor plates during manufacture.

Vacuum source 72 is fluidly coupled to apertures 107 and 109 of orifice flow restrictor plate 70. In this manner, air is drawn through apertures 107 and 109 of orifice flow restrictor plate 70 into vacuum source 72, thereby completing an airflow path beginning at belt or web transport 32, through vacuum platen 26, and ending at vacuum source 72.

Figure 3:
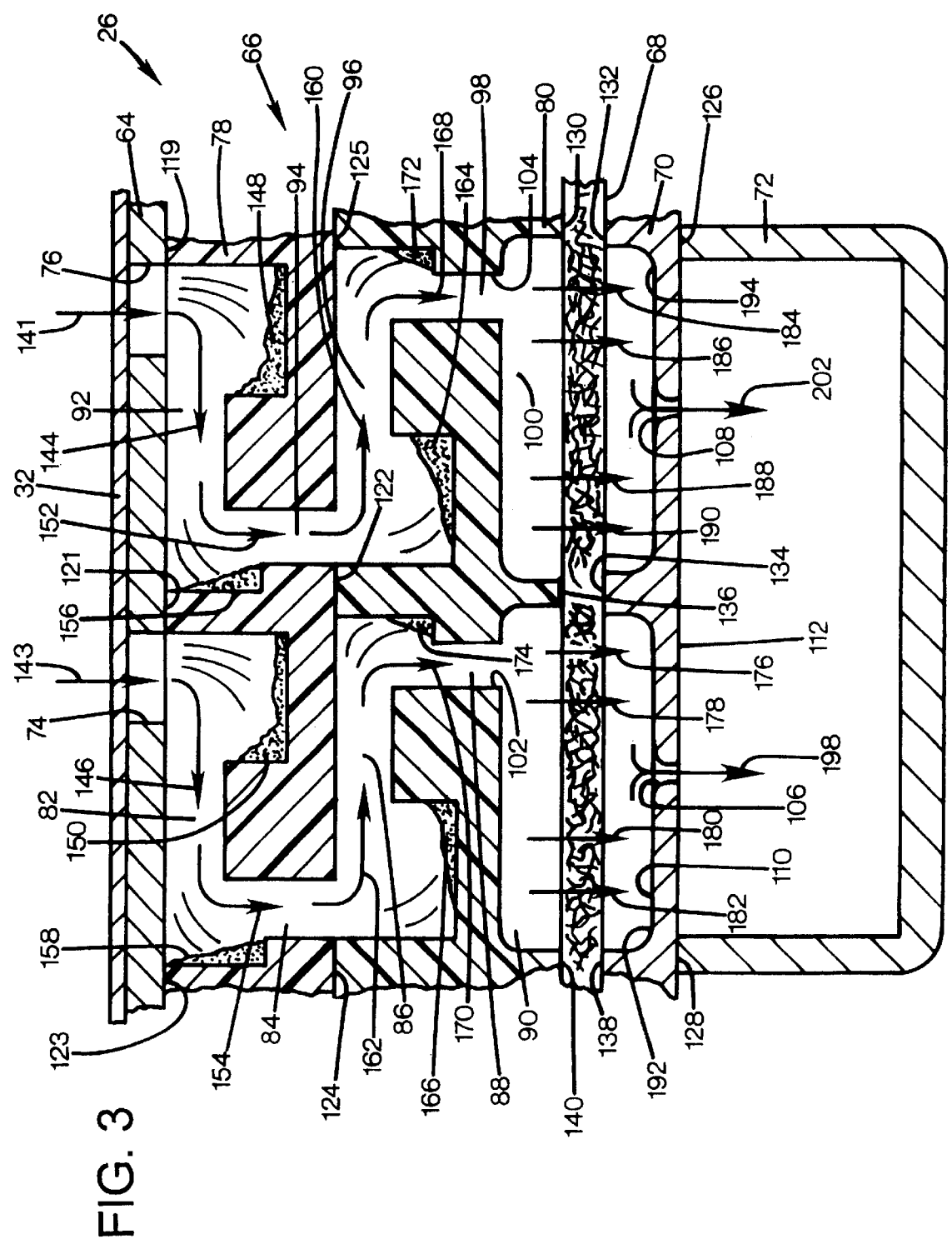
FIG. 3 is an assembled, sectional view of the vacuum platen of FIG. 2 illustrating operation of the vacuum platen in accordance with the present invention.

An assembled, sectional view of vacuum platen 26 of FIG. 2 illustrating operation of vacuum platen 26 in accordance with the present invention is shown in FIG. 3. As can be seen in FIG. 3, top plate 64 and stages 78 and 80 of labyrinth 66 are positioned adjacent one another and sealed at areas 119, 121, and 123 where top plate 64 and first stage 78 touch and at areas 125, 122, and 124 where first stage 78 and second stage 80 touch when vacuum platen 26 is assembled. Likewise, orifice flow restrictor plate 70 and vacuum source 72 are positioned adjacent one another and sealed at areas 126 and 128 where orifice flow restrictor plate 70 and vacuum source 72 touch when vacuum platen 26 is assembled. Filter 68 of vacuum platen 26 is positioned and compressed between labyrinth 66 and orifice restrictor plate 70 in the areas 130, 132, 134, 136, 138, and 140, as shown in FIG. 3. This compression of filter 68 helps limit airflow loss from passageway 90 to passageway 100 or the environment surrounding vacuum platen 26, as well as airflow loss from passageway 100 to passageway 90 or the environment surrounding vacuum platen 26.

In accordance with the present invention and as can be seen in FIG. 3, an airflow through vacuum platen 26 is established that begins by traveling through web or belt transport 32 and into apertures 74 and 76 of top plate 64, as generally represented by arrows 141 and 143 in FIG. 3. This airflow helps secure print medium 23 (see FIG. 1) to web or belt transport 32 during travel through printzone 46. As discussed above, the environment in the area of printzone 46 is often full of printing composition aerosol and spray, as well as print medium dust and other types of debris. Airflow 141 and 143 carries this debris into vacuum platen 26 where it can degrade printing device performance, as discussed above.

Airflow 141 and 143 next enters first stage 78 of labyrinth 66 where airflow 141 and 143 is angularly diverted or turns through passageways 82 and 92, as generally indicated by arrows 144 and 146. As the airflow turns, some of the mass of debris carried thereby is unable to change direction and falls out and is collected by receptacles 108 and 105 of first stage 78 of labyrinth 66, as generally indicated at 148 and 150 in FIG. 3. Airflow 144 and 146 is next angularly diverted or turns from passageways 92 and 82 to passageways 94 and 84, as generally indicated by arrows 152 and 154. As the airflow turns, additional mass of debris carried thereby is unable to change direction and falls out and is collected by receptacles 106 and 103, as generally indicated at 156 and 158.

Airflow 152 and 154 next enters stage 80 of labyrinth 66 and is angularly diverted or turns from passageways 94 and 84 to passageways 96 and 86, as generally indicated by arrows 160 and 162 in FIG. 3. As the airflow turns, further mass of debris carried thereby is unable to change direction and falls out and is collected by receptacles 114 and 110, generally indicated at 164 and 166. Airflow 160 and 162 is next angularly diverted or turns from passageways 96 and 86 to passageways 98 and 88, as generally indicated by arrows 168 and 170. As the airflow turns, still further mass of debris carried thereby is unable to change direction and falls out and is collected by receptacles 116 and 112, as generally indicated at 172 and 174.

As can be generally seen in FIG. 3, the sizes of passageways 82, 84, 86, and 88 as well as passageways 92, 94, 96, and 98 are configured to decrease in the direction of the airflow through labyrinth 66. That is, the size of passageways 82, 84, 86, and 88, as well as passageways 92, 94, 96, and 98 is configured to decrease in size from first stage 78 of labyrinth 66 toward second stage 80 of labyrinth 66. Use of such successively smaller passageways has been found to further help facilitate removal of debris from the airflow through labyrinth 66 and collection in receptacles 103, 105, 106, 108, 110, 112, 114, and 116 thereof because, as the passageways become smaller, the velocity of the debris in the airflow increases making it more difficult for the debris to change direction from one passageway to another to avoid collection in receptacles 103, 105, 106, 108, 110, 112, 114, and 116.

It should be noted that in accordance with the present invention, additional debris may be collected from the airflow through labyrinth 66 by adding additional passageway turns to those shown and described in FIGS. 2 and 3. Additional receptacles can also be added to labyrinth 66 to collect such extra debris.

Airflow 168 and 170 next enters passageways 100 and 90 from passageways 98 and 88 where it passes through filter 68, as generally indicated by arrows 176, 178, 180, 182, 184, 186, 188, and 190. As discussed above, filter 68 is configured to collect at least some of any debris from the airflow traveling though vacuum platen 26 that may not have been collected by receptacles 103, 105, 106, 108, 110, 112, 114, and 116. Additionally, filter 68 is further configured to reduce the acoustic energy level of the airflow and provide a resistance to the airflow as it travels from labyrinth 66 to orifice flow restrictor plate 70. This reduction in acoustic energy level helps to quiet vacuum platen 26 during use of printing device 20.

Subsequent to exiting filter 68, airflow 176, 178, 180, and 182 enters receptacle 192 of orifice flow restrictor plate 70 and airflow 184, 186, 188, and 190 enters receptacle 194 of orifice flow restrictor plate 70. Next, airflow 176, 178, 180, and 182 is pulled into vacuum source 72 via orifice 106 which extends through orifice flow restrictor plate 70, as generally indicated by arrow 198 in FIG. 3, and airflow 184, 186, 188, and 190 is pulled into vacuum source 72 via orifice 108 which extends through orifice flow restrictor plate 70, as generally indicated by arrow 202 in FIG. 3. As discussed above, orifice flow restrictor plate 70 is configured to impede the airflow therethrough to reduce the acoustic energy level of the airflow thereby helping to quiet the vacuum platen 26 during use thereof in printing device 20.

Although the invention has been described and illustrated in detail, it is to be clearly understood that the same is intended by way of illustration and example only, and is not to be taken necessarily, unless otherwise stated, as an express limitation, nor is it intended to be exhaustive or to limit the invention to the precise form or to the exemplary embodiment(s) disclosed. Modifications and variations may well be apparent to those skilled in the art. Similarly, any method elements described may be interchangeable with other method elements in order to achieve the same result. For example, although stages 78 and 80 of labyrinth 66 are illustrated as separate structures, in other embodiments of the present invention, stages 78 and 80 may be formed as an integral structure. As another example, although labyrinth 66 and top plate 64 are illustrated as separate structures, in other embodiments of the present invention, labyrinth 66 and top plate 64 may be formed as an integral structure. The spirit and scope of the present invention are to be limited only by the terms of the following claims.

Furthermore, reference to an element in the singular is not intended to mean "one and only one" unless explicitly so stated, but rather means "one or more." Moreover, no element or component in the present specification is intended to be dedicated to the public regardless of whether the element or component is explicitly recited in the following claims. Finally, no claim element herein is to be construed under the provisions of 35 U.S.C. Section 112, sixth paragraph, unless the element is expressly recited using the phrase "means for . . . . "

What is claimed is:

1. A method for use in a vacuum platen of a printing device, the printing device having a vacuum source and a printzone where printing composition is deposited on a print medium, comprising:

distributing a vacuum hold-down force over the printzone;

conducting an airflow from the printzone to the vacuum source and through progressively smaller passageways;

collecting debris from the airflow by re-directing the airflow as it is conducted from the printzone to the vacuum source; and filtering the re-directed airflow before it reaches the vacuum source thereby to impede the airflow to reduce an acoustic energy level of the airflow.

2. A vacuum platen assembly for a printing device comprising:

a first plate having inlet apertures fanned therethrough;

a second plate spaced from the first plate and having outlet apertures formed therethrough;

a labyrinth member disposed between the first and second plates and defining passageways between the inlet and outlet apertures; and wherein the outlet apertures are sized to be smaller than the inlet apertures thereby to restrict airflow through the vacuum platen assembly.

3. The assembly of claim 2 wherein the labyrinth member is configured so that the airflow through the passageways is multidirectional.

4. The assembly of claim 3 wherein the size of the passageways becomes progressively smaller from the inlet to the outlet apertures.

5. The assembly of claim 4 wherein the labyrinth member is configured to include receptacles formed therein adjacent to the passageways, the receptacles near the inlet apertures being smaller near the receptacles that are near the outlet apertures.

6. The assembly of claim 2 wherein the outlet apertures are shaped to have rounded edges at the junction of the outlet apertures and the second plate.

7. A method of controlling airflow through a vacuum platen of a printing device, wherein the platen has a first group of apertures adjacent to a print media transport belt and a second group of apertures leading to a vacuum source, the method comprising the step of directing airflow through progressively smaller passageways leading from the first group to the second group of apertures.

8. The method of claim 7 including the step of sizing the first group of apertures to be larger than the second group of apertures.

9. The method of claim 8 including the step of tapering the diameter of the apertures in the second group of apertures.

10. The method of claim 7 wherein the directing step includes directing the airflow through the passageways so tat the direction of airflow changes at a plurality of locations.

11. The method of claim 10 including the step of forming at each location a receptacle for receiving debris from the airflow.

12. The method of claim 10 including the step of providing a labyrinth member for defining the passageways.

13. The method of claim 12 including the step of directing through a filter the airflow that passes from the labyrinth.

14. The method of claim 13 including the step of compressing the filter between the labyrinth and an orifice member in which the second group of apertures are formed.

* * * * *